United States Patent
Cuevas Ramirez et al.

(10) Patent No.: US 9,713,059 B2
(45) Date of Patent: Jul. 18, 2017

(54) MOBILE COMMUNICATIONS HANDOVER

(71) Applicant: BRITISH TELECOMMUNICATIONS PUBLIC LIMITED COMPANY, London (GB)

(72) Inventors: Maria Angeles Cuevas Ramirez, Madrid (ES); David Paul Townend, London (GB); Ruth Elaine Brown, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/101,776

(22) PCT Filed: Nov. 19, 2014

(86) PCT No.: PCT/GB2014/053426
§ 371 (c)(1),
(2) Date: Jun. 3, 2016

(87) PCT Pub. No.: WO2015/087042
PCT Pub. Date: Jun. 18, 2015

(65) Prior Publication Data
US 2016/0345230 A1    Nov. 24, 2016

(30) Foreign Application Priority Data
Dec. 13, 2013    (EP) .................................... 13250127

(51) Int. Cl.
H04W 36/30 (2009.01)
H04W 36/14 (2009.01)
H04W 36/26 (2009.01)

(52) U.S. Cl.
CPC ........... H04W 36/30 (2013.01); H04W 36/14 (2013.01); H04W 36/26 (2013.01)

(58) Field of Classification Search
None
See application file for complete search history.

(56) References Cited

U.S. PATENT DOCUMENTS

| 2003/0069018 A1 | 4/2003 | Matta |
| 2007/0026861 A1 | 2/2007 | Kuhn et al. |

(Continued)

FOREIGN PATENT DOCUMENTS

| CN | 101656994 A | 2/2010 |
| WO | WO 99/51052 | 10/1999 |
| WO | WO 2011/033173 A1 | 3/2011 |

OTHER PUBLICATIONS

International Search Report for PCT/GB2014/053426, mailed Feb. 20, 2015, 4 pages.

(Continued)

*Primary Examiner* — Anh Ngoc Nguyen
(74) *Attorney, Agent, or Firm* — Patterson Thuente Pedersen, P.A.

(57) ABSTRACT

A cellular telephone handover process, mediated by a mobile terminal or a base station, is controlled in accordance with Quality of service Control Indicators (QCIs) such that the base station to which handover is made (if any) is selected according to parameters which relate to the capability of each base station to handle the session or sessions currently is use. Handover may also be initiated if the user initiates an application not supported by the base station currently in use. If the session is running an application with a low latency threshold (e.g., conversational voice call), and a handover could only be achieved by interrupting the session by a "release with redirection" process, the handover is not proceeded with.

11 Claims, 9 Drawing Sheets

(56) References Cited

U.S. PATENT DOCUMENTS

| | | | |
|---|---|---|---|
| 2009/0156219 A1 | 6/2009 | Kim et al. | |
| 2011/0026485 A1* | 2/2011 | Lin | H04W 36/0055 370/331 |
| 2011/0201336 A1 | 8/2011 | Garrett et al. | |
| 2013/0252660 A1 | 9/2013 | Bach | |
| 2013/0337811 A1* | 12/2013 | Faerber | H04W 36/0072 455/436 |
| 2014/0086159 A1* | 3/2014 | Sajadieh | H04W 72/12 370/329 |

OTHER PUBLICATIONS

International Search Report for PCT/GB2014/053426, mailed Feb. 20, 2015, 6 pages.
European Search Report for EP 13 25 0127, dated May 20, 2014, 2 pages.
International Preliminary Report on Patentability for PCT/GB2014/053426, mailed Nov. 13, 2015, 12 pages.
Chinese Office Action, Application No. 201480068013.0, dated Jan. 19, 2017, 4 pages (10 pages with translation).
Chinese Search Report, Application No. 201480068013.0, dated Jan. 9, 2017, 2 pages (4 pages with translation).

* cited by examiner

| Resource Type QCI | | Priority | Packet Delay Budget* | Packet Error Loss Rate | Example Services |
|---|---|---|---|---|---|
| 1 | Guaranteed Bit Rate | 2 | 100 ms | $10^{-2}$ | Conversational Voice |
| 2 | Guaranteed Bit Rate | 4 | 150 ms | $10^{-3}$ | Conversational Video (Live Streaming) |
| 3 | Guaranteed Bit Rate | 3 | 50 ms | $10^{-3}$ | Real Time Gaming |
| 4 | Guaranteed Bit Rate | 5 | 300 ms | $10^{-6}$ | Non-Conversational Video (Buffered Streaming) |
| 5 | Non-Guaranteed Bit Rate | 1 | 100 ms | $10^{-6}$ | IMS Signalling |
| 6 | Non-Guaranteed Bit Rate | 6 | 300 ms | $10^{-6}$ | Video (Buffered Streaming) TCP-based (e.g., www, e-mail, chat, ftp, p2p file sharing, progressive video, etc.) |
| 7 | Non-Guaranteed Bit Rate | 7 | 100 ms | $10^{-3}$ | Voice, Video (Live Streaming) Interactive Gaming |
| 8 | Non-Guaranteed Bit Rate | 8 | 300 ms | $10^{-6}$ | Video (Buffered Streaming) TCP-based (e.g., www, e-mail, chat, ftp, p2p file sharing, progressive video, etc.) |
| 9 | Non-Guaranteed Bit Rate | 9 | 300 ms | $10^{-6}$ | Video (Buffered Streaming) TCP-based (e.g., www, e-mail, chat, ftp, p2p file sharing, progressive video, etc.) |

Figure 9

MOBILE COMMUNICATIONS HANDOVER

PRIORITY CLAIM

The present application is a National Phase entry of PCT Application No. PCT/GB2014/053426, filed Nov. 19, 2014, which claims priority from EP Patent Application No. 1317987.4, filed Oct. 11, 2013, and GB Patent Application No. 13250127.1, filed Dec. 13, 2013, each of which is hereby fully incorporated herein by reference.

BACKGROUND

This disclosure relates to improvements to the handover process that takes place when a mobile communications device (user terminal) is required to cease communicating with a core network through one base station and begin communication through another base station. The most common reasons for such handovers to be required are because either the user terminal or the base station detects deterioration of the signal quality on the wireless communications link between them. This can be because the mobile device is moving out of range of the base station, but other changes in the wireless environment, such as changes in congestion or interference levels, may also make a handover appropriate. Handover may also occur when a user "roaming" on a network other than his "home network" (the one to which he subscribes) moves into range of a base station of his home network: in such a case a handover to the home network is desirable as soon as signal quality between the user terminal and the home network meets a predetermined threshold, regardless of the signal quality on the other network, because this will allow the user to use any facilities specific to his "home" network, and avoid paying the higher charges usually required for connection through a network other than the user's home network.

Unless the context requires otherwise, the term "base station" should be interpreted in this specification to mean any device or apparatus with which a terminal may communicate wirelessly in order to allow the terminal to communication with a backhaul connection to a core communications network. It includes, for example, access points (wireless routers) for "WiFi" (IEEE 802.11 standard) access networks, as well as the base stations used in cellular telephony.

The decision to initiate a handover, and the selection of a new link to which to hand over, is typically based on signal strength—thus, of the base stations signaling availability (having capacity to accept a connection and authorized to make connection with the mobile unit) a connection is established with the base station generating the strongest signal.

Handover can be between two cellular base stations, and in such cases is usually relatively straightforward when both base stations operate according to the same protocol. In many cases both stations are controlled by the same base site controller, which can coordinate the process. In a cellular system with permanent base stations, it is conventional to maintain a "neighbor list" for each base station which can be used to inform the mobile unit of the base stations to which handover is most likely to be possible.

However, increasingly, handsets are capable of operation in two or more different radio access technologies, for example cellular (UMTS (3G) and its packet data protocol GPRS) and WiFi (IEEE 802.11), and it is possible that a handover may be required between two base stations operating on different radio access technologies. One particular scenario occurs when a user device which has been working to an indoor short-range base station, operating on WiFi protocols, is to continue the session after leaving the premises, and therefore the range of the base station. Even within the cellular network, difficulties can arise because of the ongoing process of upgrading mobile networks from 2G ($2^{nd}$ generation) to 3G to 4G, which can result in neighboring base stations having different capabilities. For example some base stations may be not be capable of supporting both circuit-switched and packet-switched traffic.

In existing systems, loss, or deterioration, of contact with the currently-serving base station leads to an attempt by the mobile unit to seek a strong signal from another base station to which the mobile unit has access rights, and to arrange handover to that base station from the currently-serving base station. However, by relying simply on signal strength, a loss of service quality may arise because of a deterioration in other properties. For example, for a voice call (for example using VoIP—Voice over Internet Protocol) or VoLTE (Voice over Long Term Evolution Protocol), low latency and jitter are important characteristics, whereas for gaming or video streaming applications, high bit rate is a priority.

It is known, for example from patent specifications US2003/069018 (Matta), US2007/026861 (Kuhn) and WO2011/033173 (Valtion), to provide a ranking of neighbor base stations in terms of "quality of service" parameters, to allow the user to select a suitable candidate for handover. This requires the user to be familiar with the capabilities required for the applications running on the handset at the time, including any background applications.

SUMMARY

A handover process monitors an initial bearer link between a user terminal and a first base station; and when a requirement for potential handover is identified, a base station to form a preferred bearer link to the user terminal is selected from a plurality of candidate base stations. According to embodiments, the selection is made by determining the nature of the session traffic currently being handled by the initial bearer link, retrieving capability profile information relating to the capabilities of the candidate base stations, selecting a base station having a capability profile suited to handling the session traffic to be carried by the preferred bearer link, and establishing a handover and establishing a handover of the user terminal to the selected base station.

The criteria may comprise any of, or a combination of: bearer type, Quality of Service Class identifier (QCI), and the actual applications in use. Other criteria may also be used.

As is conventional, a requirement for handover may be identified in consequence of deterioration of signal strength, or an increase in interference or congestion on the initial bearer link.

Embodiments therefore modify the default behavior of the system in selecting a handover base station by using profile information to determine which (if any) of the candidate base stations support the services to be carried on the bearer link.

For example, a customer running a voice session over a wifi connection may not be handed over onto a cellular operator's network if there is no suitable radio access technology available from the cellular operator in that location. It may be preferable to drop the call when the wifi connection signal is lost, or to select an alternative cell/access network.

Embodiments improve signaling efficiency by avoiding unnecessary signaling to the target cell and optimization of the customer experience, by selecting the optimal cell to hand over to for a particular application and subscriber.

In a first embodiment the process is operated in the base station management system of a cellular network, by assessing the capabilities of the individual candidate base stations, recorded in a central database, and selecting one of the candidate base stations in accordance with selection criteria based on the application or applications currently being carried over the bearer link.

In a second embodiment the process is controlled by the user terminal, which identifies the capabilities of individual base stations, for example by interrogation or by test exchanges of data, and selecting one of the candidate base stations in accordance with selection criteria based on the application or applications currently being operated by the user terminal.

BRIEF DESCRIPTION OF THE DRAWINGS

Embodiments will be described, by way of example, with reference to the drawings, in which.

DETAILED DESCRIPTION

Figure 1:
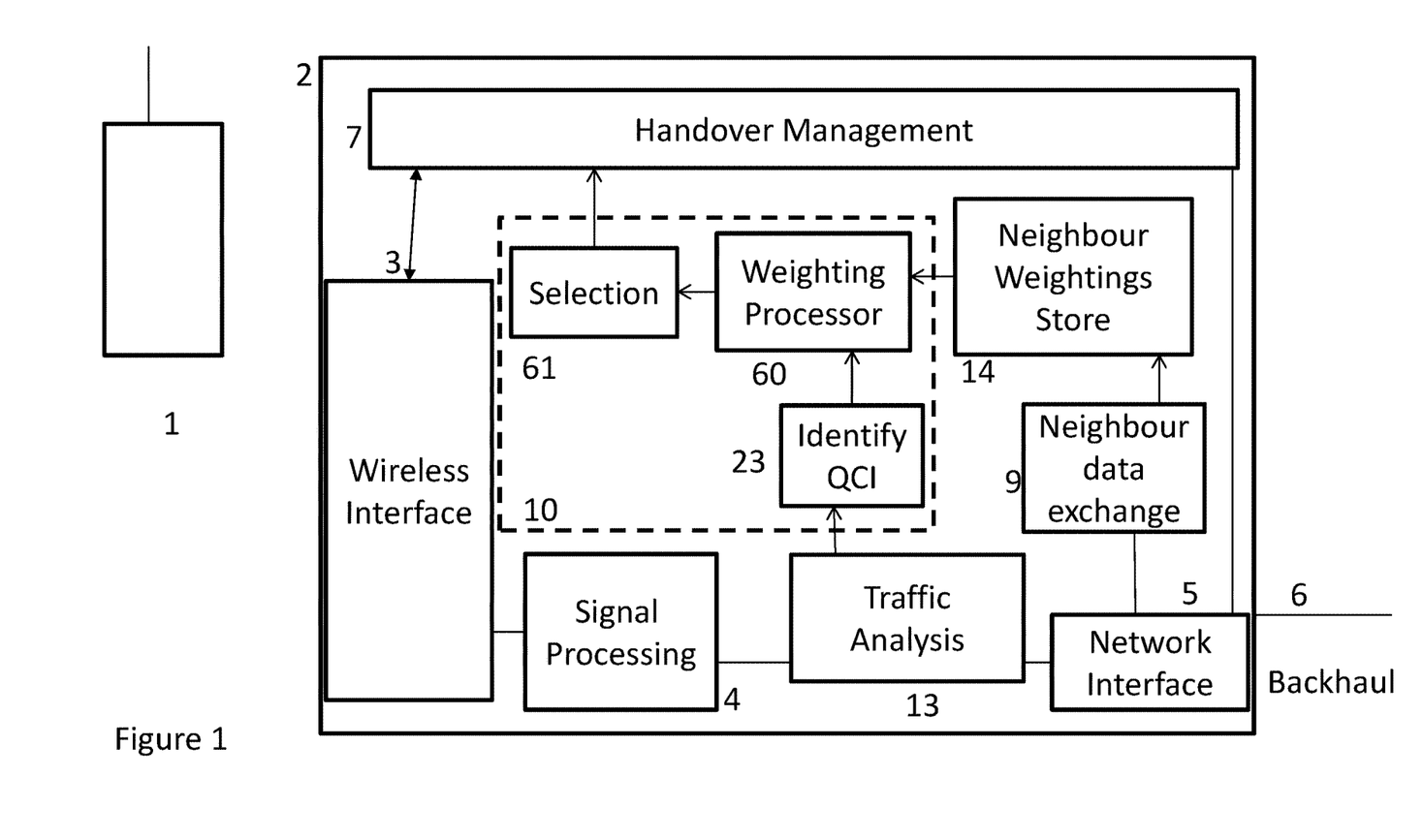
FIG. 1 depicts the relevant functional elements of a wireless base station configured to operate according to an embodiment.

FIG. 1 depicts a wireless base station 2, which may be a cellular base station or a base station for a WLAN (Wireless Local Access network), having the ability to hand over a wireless communication session with a handset 1 (e.g., a voice call, or a data session, or a video stream) to another wireless base station base station.

The wireless base station 2 comprises a wireless interface 3 for communicating with one or more user terminals 1, and a network interface 5 for connection through a backhaul link 6 to a network. Signal processing 4 (e.g., a modem) is provided for conversion between the signals carried over the wireless interface 3 and the network interface 5.

A handover management system 7 interacts with the wireless interface 3 and the network (through interface 5) to arrange for user terminals 1 to disconnect from the base station 2 and reconnect to another, (or vice versa) according to circumstances.

In some embodiments the base station 2 maintains a database 14 of data relating to other base stations, these being selected to be the stations most likely to be involved in a handover, based for example on geographical position, or on historical data on previous handovers. The data store is maintained by a data exchange processor 9, which may also pass data relating to the current base station 2 over the backhaul 6 to maintain the neighbor lists of other base stations.

The handover management system 7 interacts with a system 23 for identifying applications being used, or being set up to be used, on the link between the user terminal 1 and the base station 2. In this embodiment this function is performed by monitoring the session traffic (13) for QCI values (QoS class indicators) characteristic of different applications.

A weighting processor 61 uses the neighbor data 14 and application data 23 to generate weighting values for each candidate base station, which is used by a selection processor 10 to control the handover management system 7.

Figure 2:
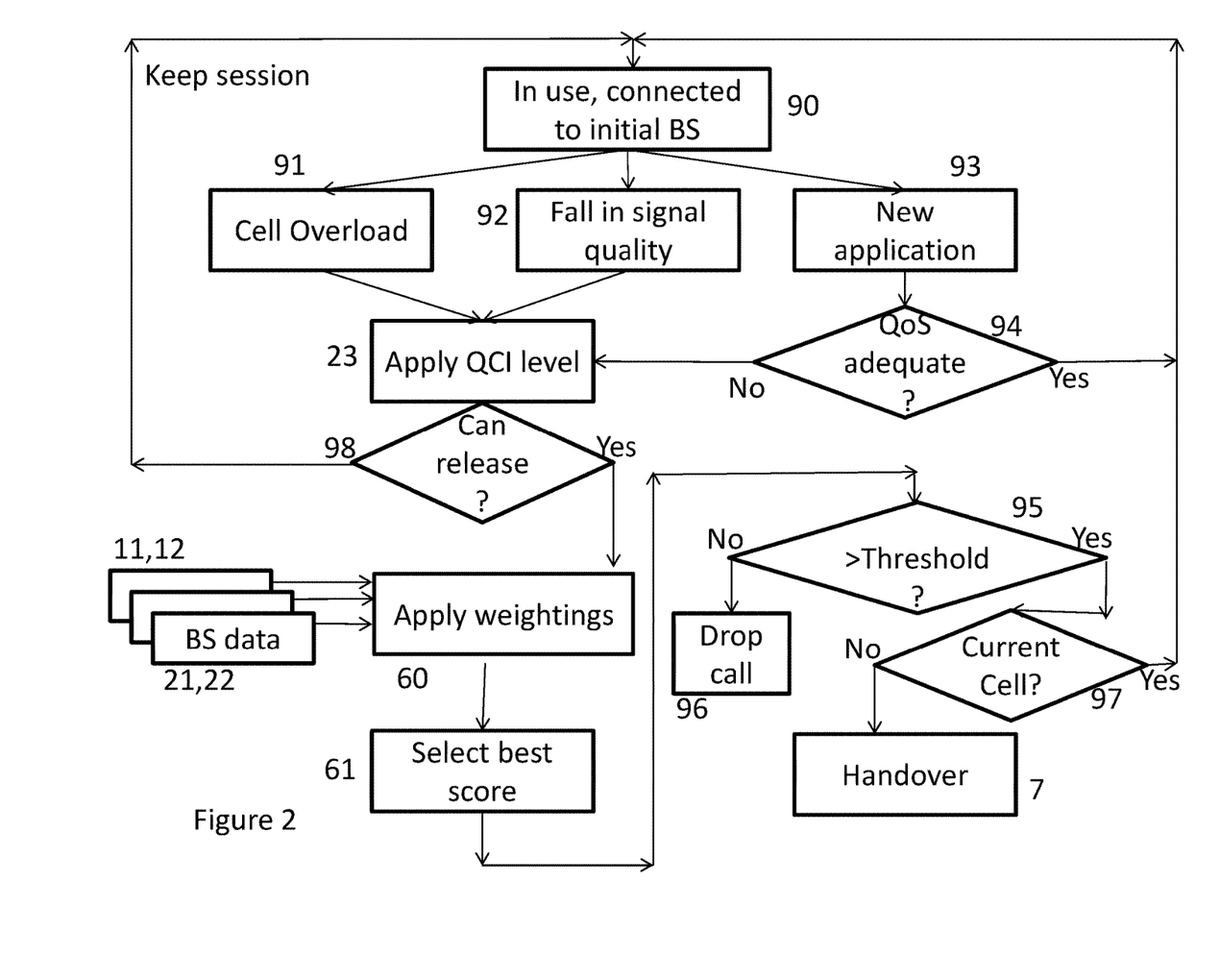
FIG. 2 is a flow chart providing an overview of the process according to an embodiment.

FIG. 2 provides an overview of the operation of the process. This process may be controlled by the base station, as shown in FIG. 1, or by the handset. In normal use, (90) the handset 1 is connected to an initial base station 2. Certain trigger conditions can occur, for example cell overload 91, a fall in signal quality 92, caused by interference or movement of the user terminal, or the starting up of a new application 93 by the user terminal, requiring a higher bandwidth or other changes in connection. These can be used to initiate the handover process.

If a new application 93 is the trigger, the system first determines whether the QoS (quality of service) parameters on the existing connection are adequate for this service (at 94) and takes no further action if this is the case. Otherwise, or if the trigger 91, 92 is some change in the link quality, the QCI (QoS Class Identifier) associated with the application being run on the connection is determined (or the most stringent QCI, if more than one application is in operation) (at 23). Data (21, 22) relating to the capabilities of the current base station 2 and data (11, 12) relating to the capabilities of one or more candidate base stations is then applied to a weighting function (60) dependant on the QCI required, and the base station with the best score is identified (61). The data 11, 12 may be collected during the handover process, or may have been harvested in advance.

This best score is compared with a threshold value (95) which is a minimum value associated with the applications to be run. If the score fails to meet the threshold the call (or the relevant application) is dropped (96). Otherwise, if the currently serving base station 2 has the highest score (97) then no handover takes place. Otherwise, handover 7 to the best-scoring base station is initiated.

In some instances, particularly when handing over from one operator to another ("roaming"), an uninterrupted "seamless" handover is not possible and the session has to be released and a new session initiated on a re-directed route, requiring a new IP address. In some applications with a very low latency threshold, in particular conversational voice applications (QCI 1) such as VoLTE which have little or no buffering, this can lead to an unacceptable gap in communication. In such a situation it can be preferable to maintain the session on the original connection despite the deterioration in call quality. Thus if it is determined that QCI=1 (98) and the handover can only be performed by "release and redirect", the session remains in operation with the original base station.

Figure 3:
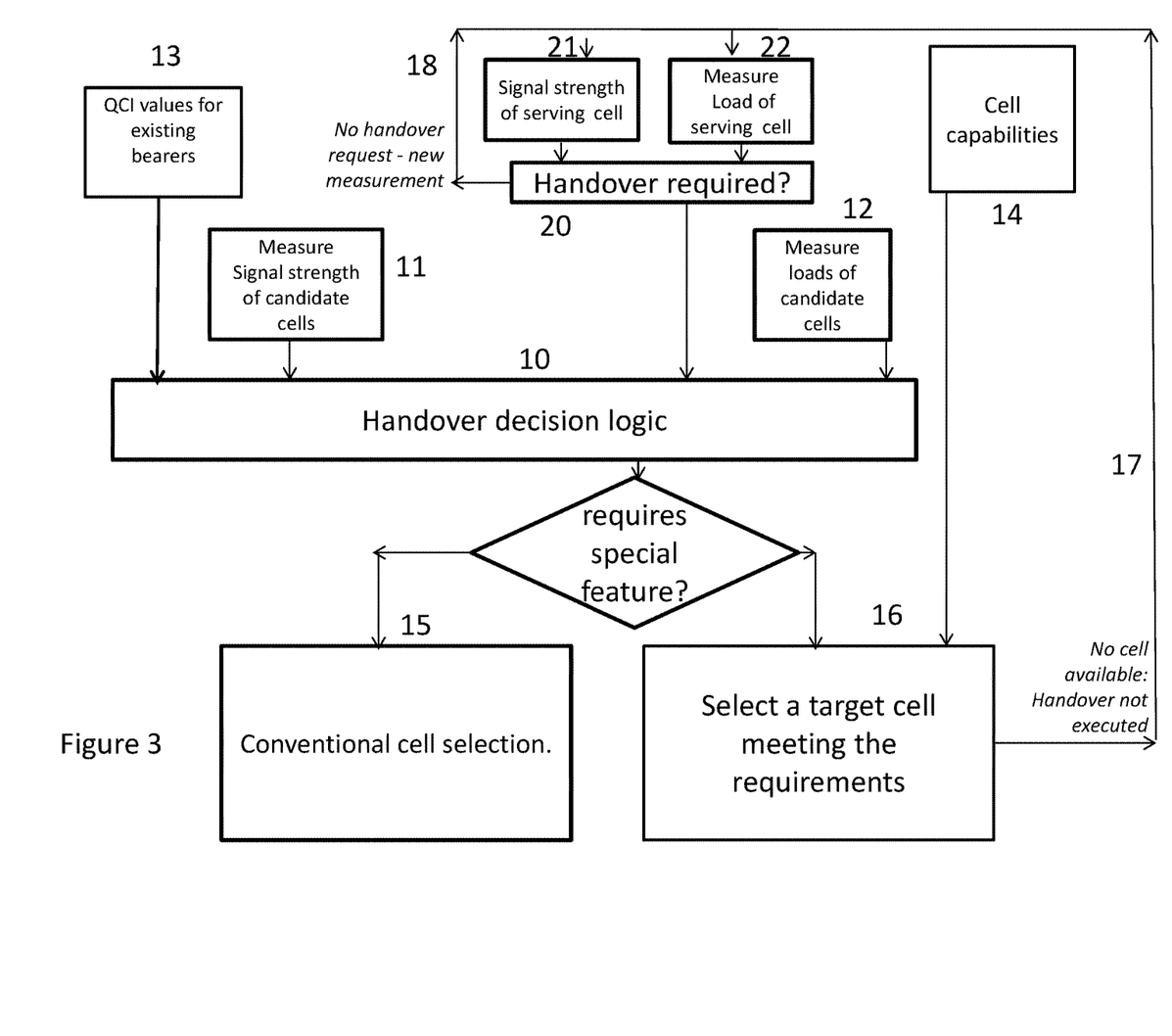
FIG. 3 is a flow diagram depicting the principal functions performed during operation, according to an embodiment.

FIG. 3 illustrates the handover decision logic 10 in more detail. It receives signal strength inputs 11, 21 relating to the signal strengths of the serving cell and one or more cells that are candidates for handover. Further inputs 12, 22 relates to the loading on each candidate cell, that is to say what capacity it has to handle a session with a further user terminal.

A further input 13 provides the QCI (Quality of Service (QoS) Class Identifier) values for each bearer. Further data 14 stored with the handover decision logic 10 includes additional information about the capabilities of neighbor cells. Conventionally such information includes features such as the radio access technology and frequencies used by the different cells.

Figure 4:
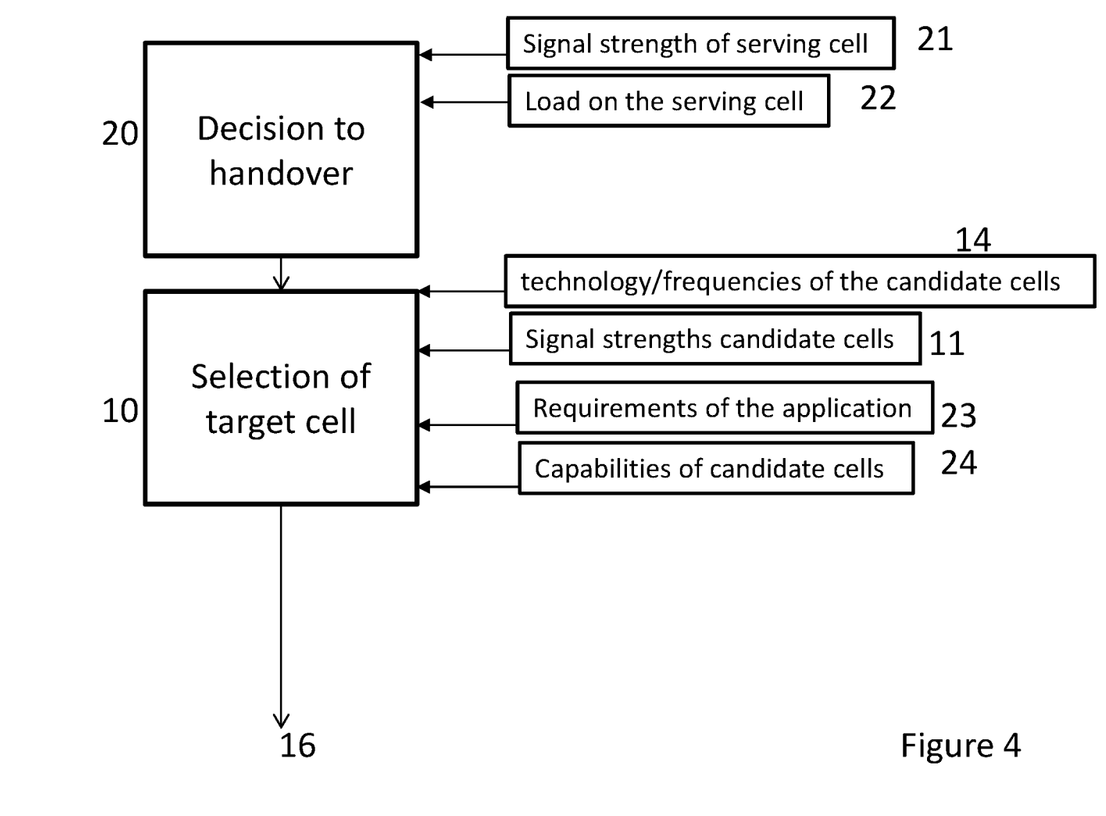
FIG. 4 depicts the decision process, and the inputs controlling that process, in more detail, in a situation in which the handover request is initiated by the base station, according to an embodiment.

In operation of the first embodiment, as shown in FIG. 4, when a mobile handset, initially in communication with a base station, moves away from the base station, or there is a source of interference, a loss of signal strength (input 21) or an overload condition 22 is detected. In response to this detected condition, a handover decision process 20 is initiated in order to select a new base station for handover using the handover decision logic 10. Conventionally this determination of the next base station is based on an evaluation of the signal strengths (11) and current processing loads (12) of all the potential handover target base stations.

As different base stations have different capabilities for handling data services, according to the invention the process also takes into account further capabilities of the target cells (e.g., ability to serve specific QCI values depending on permanent features such as backhaul capacity).

The base station or user terminal operating the process also monitors the session to be handed over to identify the application in use (input 23), so that it can determine the type of application being used by the connection (23). The handover decision logic 10 determines the QCI class of each application and, depending on the QCI values of the application in use, selection of a target handover cell is performed either on conventional principles (at 15) based on factors such as candidate target cell signal strength, and frequency, or prioritizing the requirements of the application in use (at 16).

Figure 5:
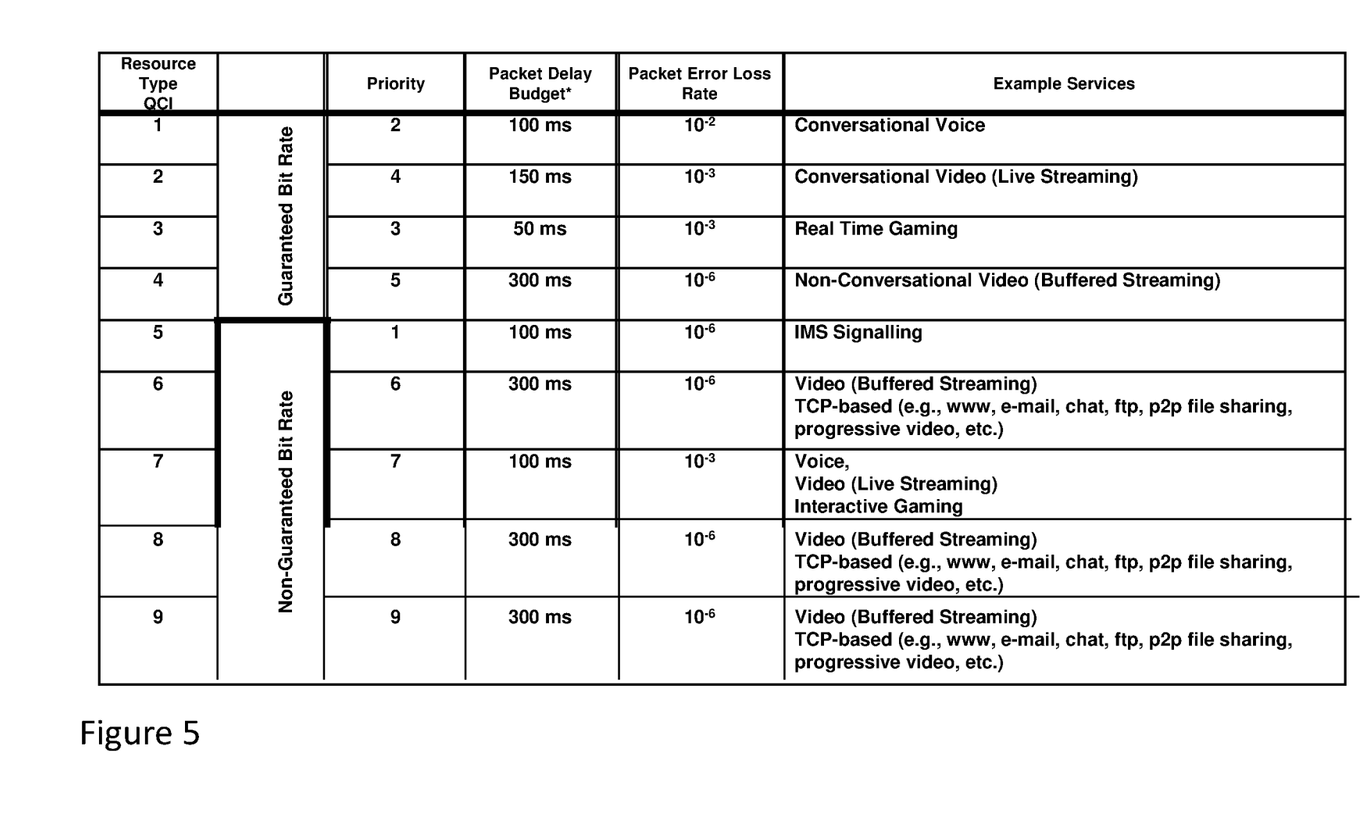
FIG. 5 lists the standardized QCI characteristics from 3GPP Standard 23.203 Section 6.1.7, which are used to define the handover criteria used in implementing embodiments.

FIG. 5 lists the standardized QCI characteristics from 3GPP Standard 23.203 Section 6.1.7, which are used in this illustrative embodiment to define the handover criteria used in implementing the invention, according to the different requirements of different applications, for example maximum packet error loss rate, latency (packet delay) and priority.

For example, voice applications can withstand relatively high loss rates because there is considerable redundancy in the listening process. In particular, conversational voice (QCI 1) can withstand a higher loss rate (1%) than a streamed voice signal (QCI 7) (0.1%) because the listener provides feedback to the speaker on how clearly he can be understood. However, delay can be very disconcerting so the voice application has a lower tolerance to delay (100 ms instead of 300 ms). Real-time gaming (QCI 3) has an even lower tolerance of delay (50 ms), as users have to react to each other's actions.

Conversely, a signaling application (QCI 5), or a heavily compressed video application (QCI 4, 6, 8 or 9), is less tolerant to packet loss (1/1,000,000) but, because of buffering, can tolerate more delay (300 ms).

The base station or user terminal has access to data containing profile information about each handover base station candidate. This data may be stored in a data base local to the base station or in a shared database accessible to several base stations, or may be collected by the base station or user terminal when a handover is required.

Figure 6:
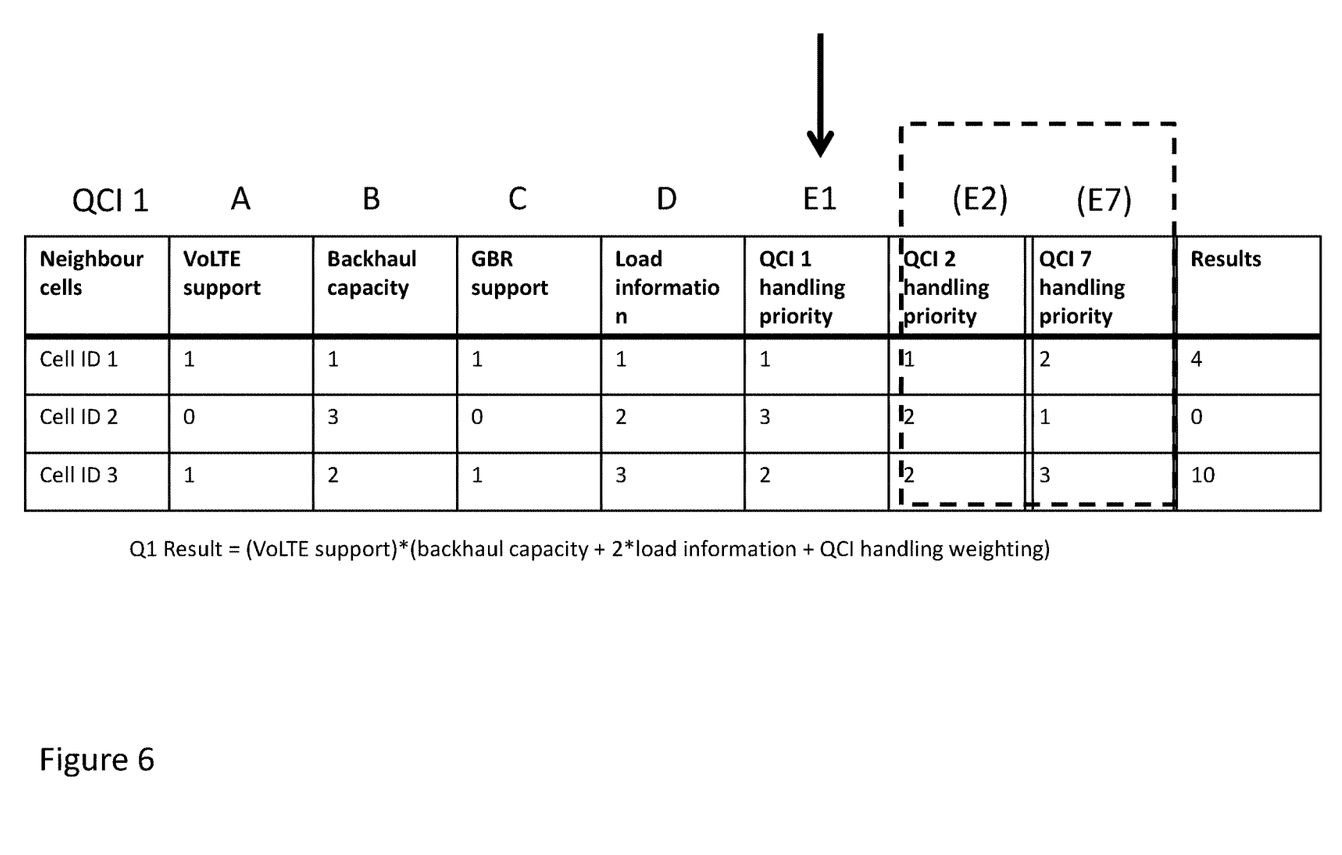
FIG. 6 depicts a first illustrative example of the decision process according to an embodiment.
Figure 7:
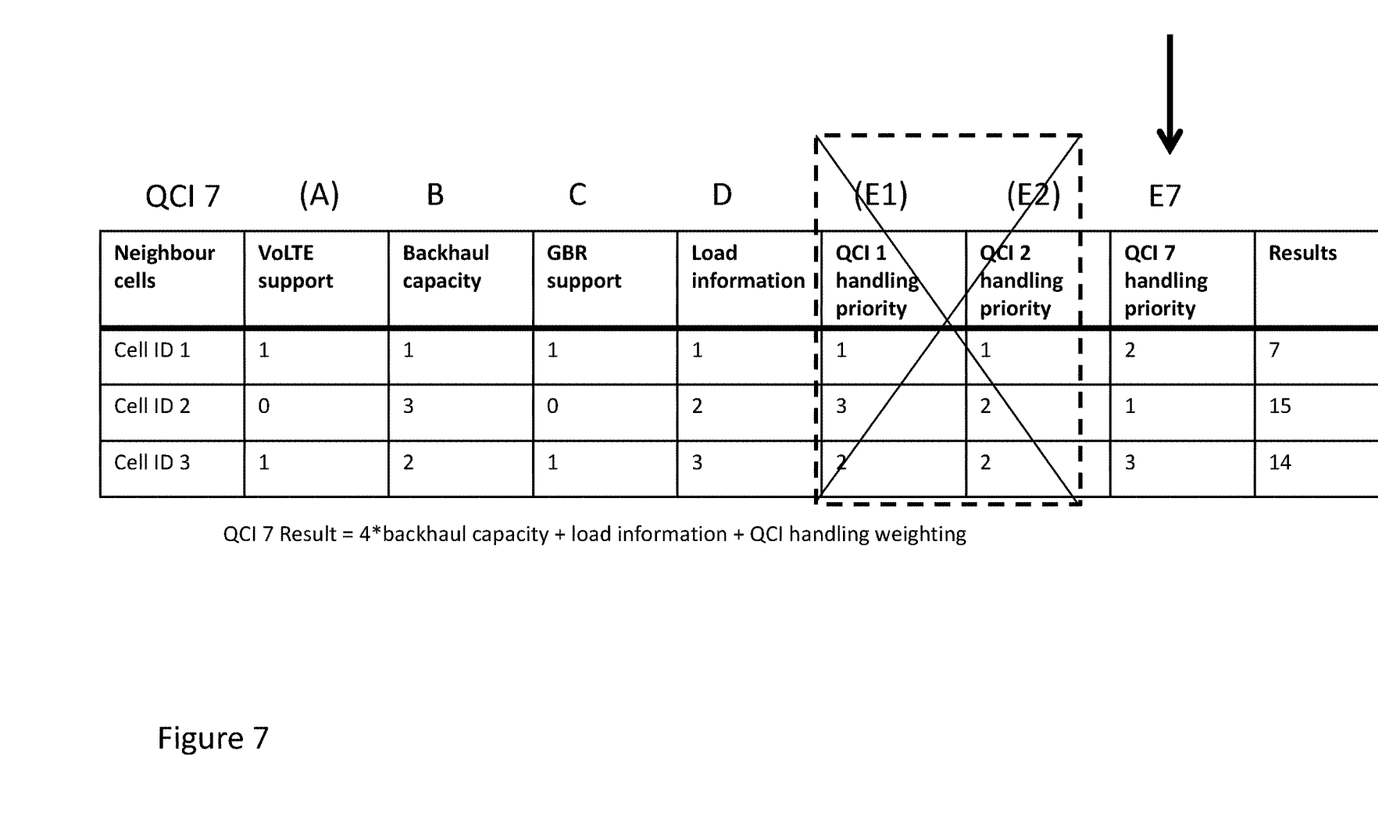
FIG. 7 depicts a second illustrative example of the decision process, using a different weighting, according to an embodiment.

FIG. 6 and FIG. 7 depict a profile containing a QCI handling priority score (E1, E2, E7) for each base station 1, 2, 3, for each of three QCI classes, namely those classes for the Guaranteed Bit Rate and non-Guaranteed Bit Rate classes QCI 1, QCI 2 and QCI 7. Each base station also has a score for VoLTE support (A), Backhaul capacity (B), Guaranteed Bit Rate support (C) load information (D), and handling priority for the QCI class in question (E1, E2, E7) as depicted in FIGS. 4 and 5.

The selection of the base station to be used is determined by applying weightings to the various scores A, B, C, D, E: these weightings depend on the required QCI class. For a factor (A, C) which is essential to support some applications, a binary label is applied depending on whether the base station in question supports that application. Thus, as shown in FIG. 6, a handover of a session on which QCI class 1 (conversational voice) is in use, an illustrative weighting score is determined according to the formula:

$$\text{Score(QCI1)}=A*(B+D+E1)$$

(note the binary label A multiplying the score by zero in this formula, thus giving any cell unable to provide VoLTE support a score of zero).

Figure 8:
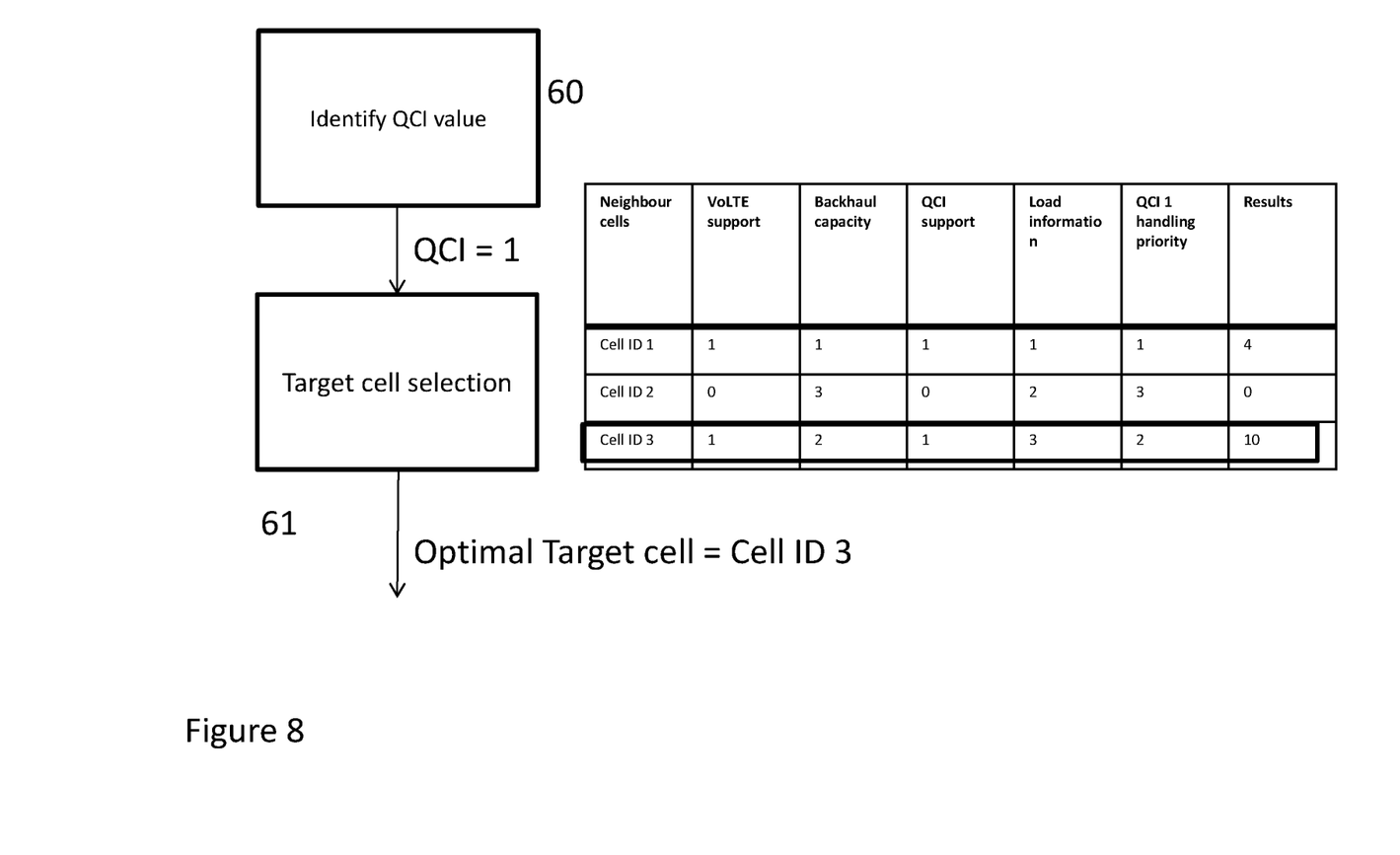
FIG. 8 depicts the final stage in the target cell selection process according to an embodiment.

These calculations thereby identify Cell ID 3 as having the highest score for QCI 1. Thus, as shown in FIG. 8 (for QCI 1) the QCI value appropriate for the application in use is selected (at 60) and the target cells are then assessed to identify the optimum cell (at 61) to which connection can be made.

Similarly, as shown in FIG. 7, a handover of a session on which QCI class 7 (streamed voice or video) is in use, an illustrative weighting score is determined according to the formula:

$$\text{Score(QCI7)}=4B+D+E7$$

These calculations thereby identify cell ID 2 as having the highest score for QCI 7.

The QCI value appropriate for the application in use can therefore be selected (at 60) and the target cells are then assessed to identify the optimum cell (at 61) to which connection can be made.

Referring again to FIG. 3, the selection of the target cell (at 16) may determine that the currently serving cell is the optimum one for the application in use. This may be, for example, because no other cell in the vicinity having a better signal quality than the currently serving cell can support the application being run, or because a handover would have to be performed by "release with redirection" rather than seamlessly, and the application has a low latency threshold (at 98, FIG. 2). In such a case, the selection at 16 determines that no handover should take place (at 17). The serving base station may then either drop the call, or may continue to operate the session, requesting further measurements (at 18) to monitor the continuing signal quality of the bearer link supporting the session.

The process may be initiated by any of several trigger events. If a user-connected cell, engaged on an application session that requires high QoS (i.e. low latency and jitter— e.g. VoLTE) becomes overloaded, the base station makes a decision to try to hand some of the user terminals over to a different radio access technology and/or frequency. The decision as to which devices should be handed over depends both on application requirements (application-type/bearer) and capabilities of the target cell (e.g. RAT, congestion level).

In an alternative scenario, in which handover is based on the serving cell's signal strength): when the signal strength of the serving cell becomes weak, the base station makes a decision as to which target radio access technology and frequency a handover should be performed. This is again based on the application requirements (application-type/bearer) and the capabilities of the target cell (e.g. RAT, congestion level)

The outcome could be that the operator decides to which target cell (RAT/frequency) handover should be made to ensure that quality of experience can be maintained. For example, it may be preferable to drop a VoLTE call than carrying on with severely degraded quality.

In a further scenario, a cellular to wifi handover decision is made by the user equipment based on data stored in the user equipment. The user terminal is initially connected to a first cell and engaged on an application session that requires high QoS (i.e. low latency and jitter—e.g. VoLTE). The terminal determines that a handover to WiFi may be desirable, and the handover decision is made based on the application(s) that are currently being used on the device.

Figure 9:
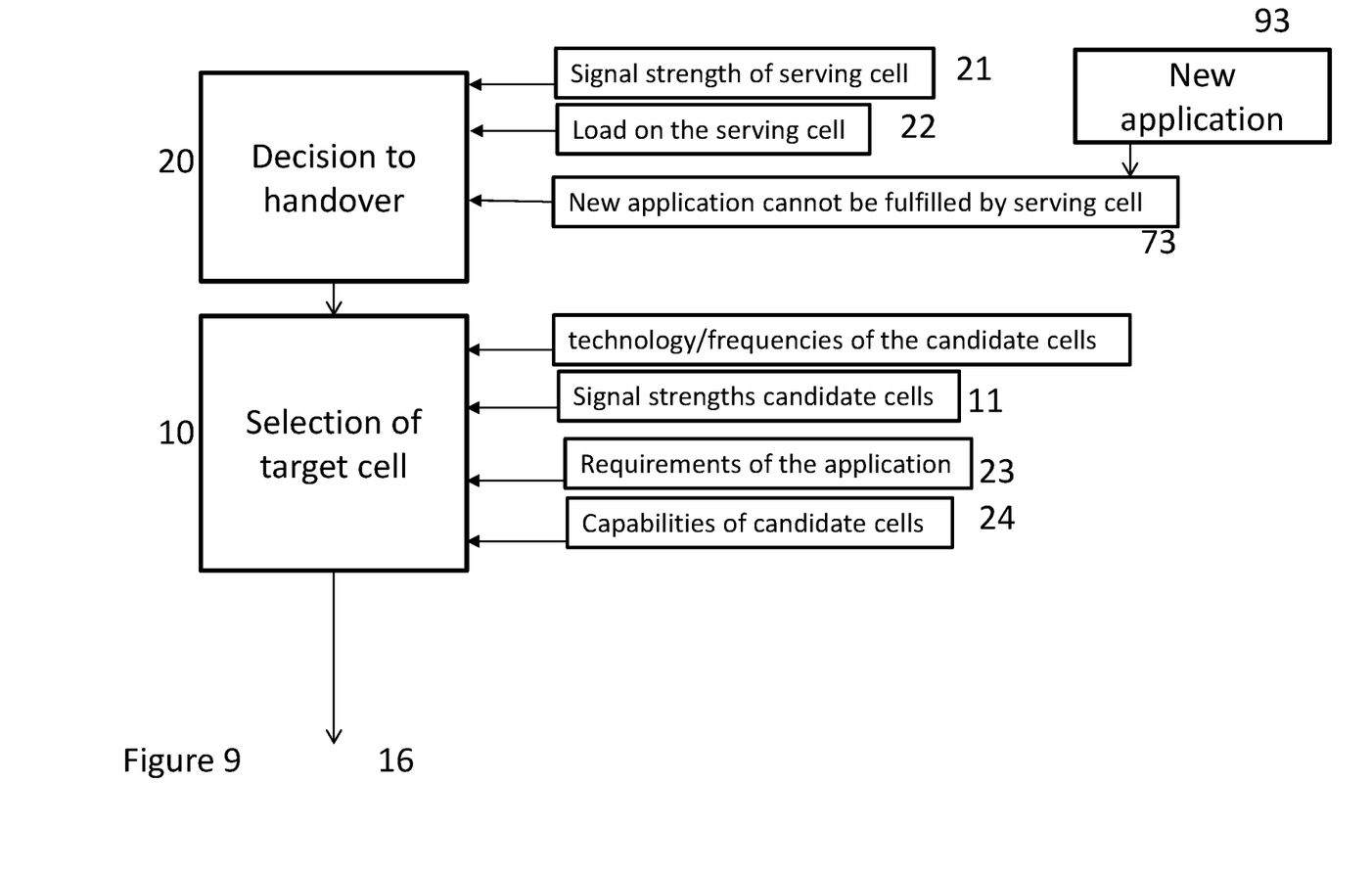
FIG. 9 depicts a variant of FIG. 4 in which the handover request is controlled by the base station but initiated by the user terminal according to an embodiment.

In a yet further scenario, depicted in FIG. 9, the handover process is triggered by the initiation of an application with a high QCI priority application (at 93). The handset may initiate the handover process by transmitting a notification 73, indicative of the application required, to the currently-serving base station. This base station then initiates the base station selection and handover processes, prior to the data session being initiated. The processing to select the new handset is otherwise the same as for a network-initiated handover.

The invention claimed is:

1. A mobile communications handover method comprising:
    monitoring an initial bearer link between a user terminal and a first base station;
    identifying a requirement for potential handover;
    selecting a second base station to form a preferred bearer link to the user terminal from a plurality of candidate base stations;
    wherein the selection is made by:
        determining the nature of the session traffic currently being handled by the initial bearer link,
        retrieving capability profile information relating to the capabilities of the candidate base stations,
        selecting the second base station having a capability profile suited to handling the session traffic to be carried by the preferred bearer link, and
        establishing a handover of the user terminal to the selected second base station.

2. The mobile communications handover method according to claim 1, wherein for predetermined classes of session traffic the selected second base station is the first base station, such that no handover takes place.

3. The mobile communications handover method according to claim 2, wherein if the class of session traffic has a latency threshold below a predetermined value and handover to another base station would be performed using release with redirection, the bearer link to the first base station is maintained.

4. The mobile communications handover method according to claim 1, in which the requirement may comprise any of, or a combination of: bearer type, Quality of Service Class identifier (QCI), and the actual applications in use.

5. The mobile communications handover method according to claim 4, in which the capabilities of each base station are weighted according to the requirements of the traffic being handled by the bearer link, and the second base station is selected for handover according to the weighted capabilities.

6. The mobile communications handover method according to claim 4, in which the capabilities of each base station are weighted according to the requirements of the traffic being handled by the bearer link, and if no base station is identified as meeting a predetermined minimum weighted capability for the nature of the traffic required by the session, the session is terminated.

7. The mobile communications handover method according to claim 1, wherein the base station capabilities are retrieved from a data store.

8. The mobile communications handover method according to claim 1, wherein the base station capabilities are identified by interrogation of base stations within wireless range.

9. A mobile communications base station, arranged to operate according to claim 1 to arrange handovers for user terminals communicating with the base station over a bearer link.

10. A mobile communications user terminal, arranged to operate according claim 1 in order to manage a hand over from connection over a bearer link to a first base station to identify a second base station to which to establish a connection over a new bearer link.

11. The mobile communications user terminal according to claim 10, arranged to operate handovers between bearer links with base stations operating according to different wireless protocols.

* * * * *